United States Patent [19]
Ohno

[11] 3,747,414
[45] July 24, 1973

[54] DEVICE FOR MEASURING AN AMOUNT OF POWDERED MILK AND DISSOLVING THE SAME

[76] Inventor: Masaji Ohno, 2-5 Kayabacho, Nikonbashi, Chuo-ku, Tokyo, Japan

[22] Filed: Sept. 23, 1971

[21] Appl. No.: 183,053

[30]      Foreign Application Priority Data
    Oct. 5, 1970    Japan................................ 45/98138

[52] U.S. Cl. ................................ 73/428, 215/11 R
[51] Int. Cl. ........................................... G01f 19/00
[58] Field of Search...................... 73/426, 427, 428; 222/189; 215/11 E, 11 R; 99/77.1 R

[56]           References Cited
           UNITED STATES PATENTS
2,876,113   3/1959   Barton........................... 215/11 E X
3,309,980   3/1967   Bozek .............................. 99/77.1 X
3,527,269   9/1970   Welton .............................. 73/426 X
1,367,568   2/1921   Smith................................ 99/77.1 R
1,648,906   11/1927  Lubrano........................... 99/77.1 R Primary Examiner—Richard C. Queisser
Assistant Examiner—Daniel M. Yasich
Attorney—Woodhams, L. Martin Flynn et al.

[57]          ABSTRACT

A device for measuring an amount of powdered milk and dissolving the same, comprising a substantially cylindrical vessel which can be inserted into a nursing bottle through the mouth portion thereof, the wall of said vessel having perforations of such sizes that dry powdered milk can be prevented from spilling out therethrough under the static gravity thereof due to the static friction of the dry powder, but which allow the dry powder to spill out therethrough when shocks are applied thereto or which allow the powder to flow out therethrough when the powder is dissolved in the water poured into the vessel.

10 Claims, 2 Drawing Figures

PATENTED JUL 24 1973 3,747,414

INVENTOR
MASAJI OHNO

BY Woodhams, Blanchard & Flynn
ATTORNEYS

DEVICE FOR MEASURING AN AMOUNT OF POWDERED MILK AND DISSOLVING THE SAME

BACKGROUND OF THE INVENTION

1. Field of the Invention

This invention relates to a device for measuring an amount of powdered milk and dissolving the same.

2. Description of the Prior Art

When a nursing bottle is to be prepared with a predetermined amount of milk contained therein, it is conventionally required that a predetermined amount of powdered milk is introduced into the nursing bottle by several scooping operations using a relatively small measuring spoon. This scooping operation is troublesome because it requires not only skillful operation of the measuring spoon so as not to spill the powder out of the mouth of the bottle but also mental concentration for counting the number of scooping operations.

This troublesome repetition of scooping operations can be avoided, for example, by using a relatively large cup provided with graduations like a measuring flask. In this case, however, there are encountered other difficulties because it generally requires several operations of adding or subtracting some amount of the powder into or out of the measuring cup by means of an auxiliary spoon or by tilting the measuring cup before the measuring cup is correctly charged with a predetermined amount of the powder, and that when the powder charged in the measuring cup is transferred into a nursing bottle, there is still a greater danger than the case of using a relatively small measuring spoon that the powder is spilled out of the mouth of the nursing bottle.

SUMMARY OF THE INVENTION

Accordingly, it is an object of this invention to provide such a device for measuring an optionally predetermined amount of powdered milk which enables a user to readily take out the predetermined amount of the powder with no troublesome repetition of scooping operation by a measuring spoon or without adding or subtracting of the powder into or out of the device by means of an auxiliary spoon or by tilting the device.

Another object of this invention is to provide such a device for dissolving a predetermined amount of powdered milk which makes it possible to introduce the predetermined amount of the powder into a nursing bottle with no danger of spilling the powder out of the mouth of the nursing bottle.

The above-mentioned objects are accomplished, according to this invention, by a device for measuring an amount of powdered milk and dissolving the same, comprising a substantially cylindrical vessel which can be inserted into a nursing bottle through the mouth portion thereof, the wall of said vessel having perforations of such opening dimensions that are the largest to prevent dry powdered milk from spilling out therethrough under the static gravity thereof.

It is expedient that the vessel is provided with level graduations to show the amount of powdered milk contained therein.

By using the device according to this invention, an optionally predetermined amount of powdered milk is measured and taken out of a source of powdered milk, such as a can, in such a manner that an amount of powdered milk sufficiently in excess of the predetermined amount is scooped by the device, preferably by one scooping operation, and then the device is given proper shocks by, for example, being knocked against a peripheral portion of the can, whereby the powdered milk contained in the perforated vessel gradually spills out through the perforations until the amount of the powdered milk contained in the vessel is reduced just to the level correponsding to the predetermined amount. The device which has been charged with the predetermined amount of powdered milk is then smoothly transferred toward a nursing bottle, and the perforated vessel portion thereof is inserted into the nursing bottle. Then, water or preferably hot water is poured into the perforated vessel. By pouring in water or hot water, the powdered milk contained in the perforated vessel is readily dissolved in the water and flows out of the perforated vessel together with the water, leaving the device in the bottle in the emptied condition.

According to an additional feature of this invention, the device may be provided with a flanged portion around the upper end of the substantially cylindrical vessel so that the device is by itself suspended in a nursing bottle by the flanged portion being suspended on the peripheral portion of the mouth of the nursing bottle when water is poured into the vessel.

According to still another feature of this invention, the device may be provided with a handle for the convenience of handling the device.

According to a further feature of this invention, the device may be provided with a funnel firmly or detachably mounted at the upper end of the vessel so that the pouring of water into the vessel is made easier.

BRIEF DESCRIPTION OF THE DRAWING

This invention will now be described more particularly with reference to the accompanying drawing, in which.

DESCRIPTION OF THE PREFERRED EMBODIMENT

Figure 1:
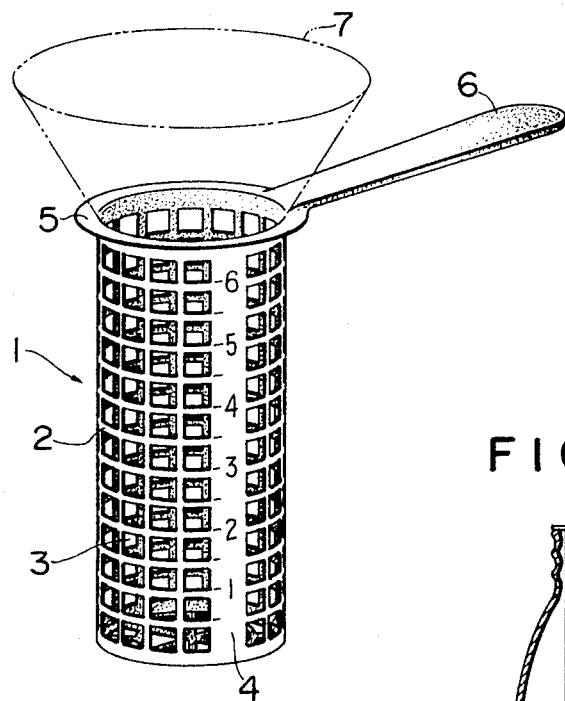
FIG. 1 is a perspective view of a preferred embodiment of the device for measuring an amount of powdered milk and dissolving the same according to this invention.

Referring to FIG. 1, the device for measuring an amount of powdered milk and dissolving the same, generally shown by reference numeral 1, is substantially composed of a cylindrical vessel 2 made of a synthetic resin or a wire net. The cylindrical vessel 2 has a mesh side wall and bottom defining perforations 3 extending over substantially the entire surface thereof. The dimensions of the perforations 3 are determined to give the largest openings which prevent dry powdered milk from spilling out therethrough under the static gravity thereof due to the static friction of the powder, and actually have a narrowest gap of about 2 to 6 mm (millimeters). This means that, in the embodiment shown in FIG. 1, wherein the perforations have a substantially square shape, the length of the side of the square is about 2 to 6 mm. Since dry powdered milk has a relatively high static friction factor, the powder is held relatively stably by the peripheral portions defining the perforations having such dimensions as described above. If the perforations are too large, there is a danger that powdered milk can not be stably held in the vessel, while if the perforations are too small, there is a drawback that the powdered milk once introduced into the vessel can not be readily spilled out through the perforations for the purpose of adjusting the amount even when the vessel is subjected to shocks or vibrations by, for example, being knocked against the peripheral portion of a can and that the powdered milk contained in the vessel can not be readily blowed out of the vessel by pouring water into the vessel.

Although the perforations 3 of the embodiment shown in FIG. 1 have a substantially square shape, it is possible to provide other shapes such as rectangular, circle, oval, etc. of the perforations may be a group of slits.

The cylindrical vessel 2 is provided with a scale 4 extending in its longitudinal direction at a peripheral portion thereof to show the amount of the powdered milk charged in the vessel up to the level indicated by the scale.

Figure 2:
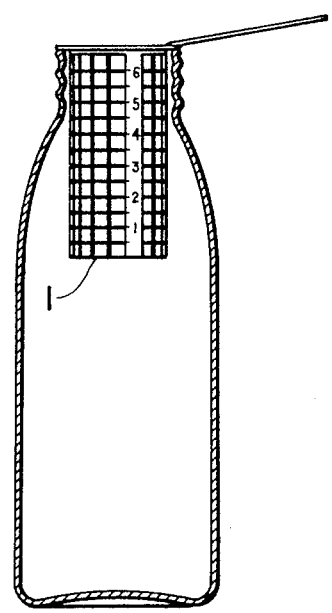
FIG. 2 is a longitudinal section of a nursing bottle, in which is inserted the device shown in FIG. 1.

At the upper end portion of the vessel 2, the device 1 is formed with a flange 5 adapted to engage with the periphery of the mouth of a standard nursing bottle when the device 1 is inserted into the nursing bottle as shown in FIG. 2.

For the convenience of handling the device 1, such as scooping powdered milk or inserting it into a nursing bottle, a handle 6 may be provided.

If the device as shown in FIG. 1 is made of a thermoplastic resin, the device 1 including the cylindrical vessel 2, the flange 5 and the handle 6 may preferably be formed by an extrusion process of the thermoplastic resin.

Furthermore, a funnel 7 may be provided to make it easier to pour water into the vessel 2. The funnel may be formed as a unitary portion of the device 1, or it may be formed as a separate part adapted to be detachably mounted at the upper end of the vessel 2.

It will be appreciated that when water or hot water is poured into the vessel 2 which contains dry powdered milk and is inserted into a nursing bottle as shown in FIG. 2, the dry powdered milk is instantly dissolved in the water and flows out of the vessel through the perforations 3 to be introduced into the nursing bottle.

I claim:

1. A device for measuring an amount of powdered milk and dissolving the same, comprising a substantially cylindrical vessel of a size insertable into a nursing bottle through the mouth portion thereof, said vessel being open at its upper end to provide an open mouth portion and having a cup-shaped wall provided with perforations which have a narrowest transverse dimension small enough to substantially prevent dry powdered milk from spilling out therethrough due to the static friction of the dry powdered milk in the perforations in the vessel but which are large enough to allow the dry powdered milk to spill out therethrough when the dry powdered milk in the vessel is given a shock, said vessel being first filled through said open mouth portion with a greater amount of dry powdered milk than is required to be measured and then the amount of the dry powdered milk is reduced to the desired amount by selectively applying shocks to the vessel to cause some of the dry powdered milk contained therein to spill out through said perforations.

2. A device according to claim 1, wherein the narrowest dimension of said perforations is in the range of from about 2 to 6 mm.

3. A device according to claim 1, wherein said perforations are substantially of a rectangular shape.

4. A device according to claim 1, wherein said perforations are substantially of a round shape.

5. A device according to claim 1, wherein said perforations are substantially of a slit shape.

6. A device according to claim 1, wherein said vessel is provided with a scale extending in a longitudinal direction on the outer surface of the sidewall thereof.

7. A device according to claim 1, wherein the device is provided with an outwardly extending flange at the upper end portion of said vessel.

8. A device according to claim 1, wherein the device is provided with a handle projecting sidewardly from the upper end of said vessel.

9. A device according to claim 1, wherein the device is provided with a funnel extending upwardly from the upper end of said vessel to facilitate pouring of a liquid therethrough.

10. A device for measuring an amount of powdered milk and dissolving the same, comprising a cup-shaped, substantially cylindrical vessel of a size insertable into a nursing bottle through the mouth thereof, said vessel having an open top, a sidewall and a bottom wall, said walls defining an unobstructed central chamber which is open at its upper end and which is adapted for holding powdered milk, said vessel having a marginal annular flange extending laterally outwardly at the upper end of said sidewall, said flange being of a size capable of resting on the upper edge of the nursing bottle so that the vessel is suspended by said flange and extends downwardly into said vessel, said vessel having a handle extending laterally outwardly from said flange, said sidewall having a lengthwise extending imperforate section having indicia thereon for measuring the contents of said vessel, the remainder of said sidewall and said bottom wall having perforations which perforations have their smallest dimension in the range of from about 2 to about 6 mm., to prevent dry powdered milk from spilling out therefrom due to the static friction of the powdered milk in the perforation, but which permit dry powdered milk to be discharged therefrom when shocks are applied to the vessel.

* * * * *